US006612341B2

United States Patent
Vu

(10) Patent No.: US 6,612,341 B2
(45) Date of Patent: Sep. 2, 2003

(54) SECURING SHELL ASSEMBLIES TO PIPELINES

(75) Inventor: Dan Quoc Vu, Loughborough (GB)

(73) Assignee: Lattice Intellectual Property Limited, London (GB)

(*) Notice: Subject to any disclaimer, the term of this patent is extended or adjusted under 35 U.S.C. 154(b) by 0 days.

(21) Appl. No.: 10/258,529
(22) PCT Filed: Apr. 24, 2001
(86) PCT No.: PCT/GB01/01810
§ 371 (c)(1), (2), (4) Date: Oct. 25, 2002
(87) PCT Pub. No.: WO01/84038
PCT Pub. Date: Nov. 8, 2001

(65) Prior Publication Data
US 2003/0102042 A1 Jun. 5, 2003

(51) Int. Cl.⁷ .................. F16L 55/16; F16L 41/06
(52) U.S. Cl. .................. 138/99; 138/97; 138/158; 138/159; 264/36.1
(58) Field of Search .................. 138/99, 97, 156, 138/158, 159, 157; 264/36.1

(56) References Cited

U.S. PATENT DOCUMENTS 4,240,650 A    12/1980   Adams ................. 138/994
4,251,170 A *  2/1981   Sheridan .............. 406/197
5,797,432 A *  8/1998   Bennett et al. ........ 138/99
5,918,639 A    7/1999   Ottestad et al. ....... 138/99

FOREIGN PATENT DOCUMENTS

EP   0 779 465    6/1997
FR   2 664 360    1/1992
WO   01 07820    2/2001

* cited by examiner

Primary Examiner—Patrick Brinson
(74) Attorney, Agent, or Firm—Oblon, Spivak, McClelland, Maier & Neustadt, P.C.

(57) ABSTRACT

A method for securing a shell assembly to a pipeline. A two part shell assembly is secured to the pipeline and holds in position an annular sealing arrangement located about a predetermined area of the outer surface of the pipeline. The sealing arrangement includes a containment ring surrounding an annular seal. The containment ring is provided with connected through passages so that sealant can be introduced by a hole in the assembly into the passages to provide sealing between the containment ring and the pipeline, and between the containment ring and the shell assembly. Thus, should the annular seal fail during service the introduced sealant provides a seal.

16 Claims, 5 Drawing Sheets

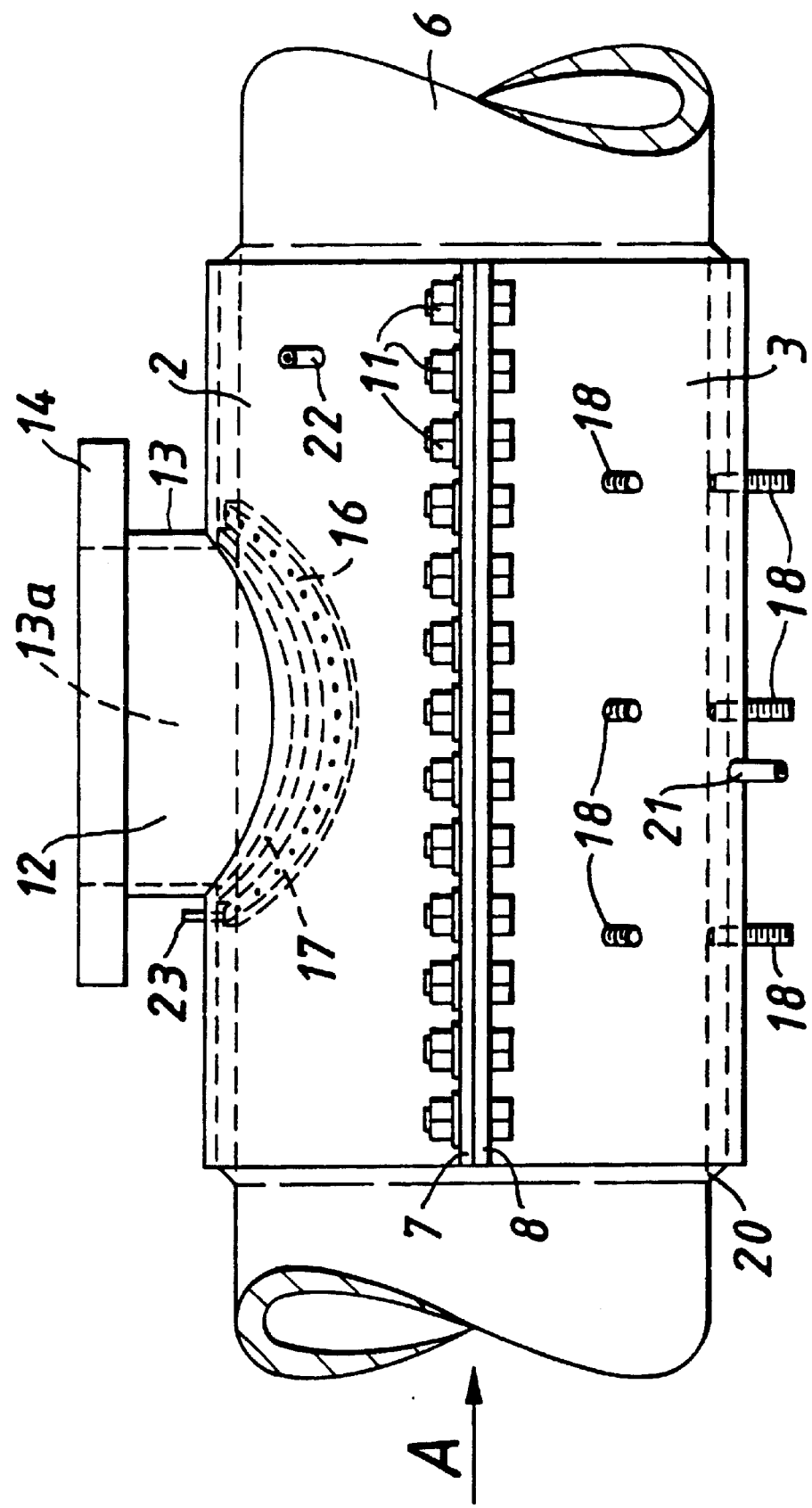

SECURING SHELL ASSEMBLIES TO PIPELINES

The present invention relates to the connection of tee or branch assemblies to pipelines such as gas or water mains and the repair of damaged such pipelines or water mains basically using two half-shells which are secured together to form a shell assembly which encircles the pipelines leaving an annulus between the pipeline and the shell assembly.

According to the invention, a method is provided for securing a shell assembly to a pipeline, wherein the shell assembly comprises a first part for locating on the side of the pipeline remote from a side which is damaged or from which a branch is to extend, and a second part, optionally incorporating a branch, for locating on the side that is damaged or from which the branch is to extend, the method comprising positioning a containment ring on the pipeline at the required position on the pipeline and surrounding the damaged area or the area from which the branch is to extend, positioning an annular seal on the pipeline so that the seal is wholly radially within the containment ring, positioning the second part of the shell assembly onto the seal, positioning the first part of the assembly on the pipeline and securing the first and second parts together so as to compress the seal and leave an annular space between the first and second parts and the external surface of the pipeline, providing sealing means for substantially preventing fluid from escaping from the annular space, wherein the upper and lower sides of the containment ring are each provided with an annular groove, with the annular grooves being connected to each other by a plurality of passages extending through the ring from one groove to the other, and introducing sealant via a hole provided or made in the wall of the assembly, into the upper groove to fill the lower groove, the passages and the upper groove to provide sealing between the containment ring and the pipeline, and between the containment ring and the assembly.

Grout may be introduced into the annular space that bonds the branch assembly in position on the pipeline on curing.

In the case where the second part incorporates a branch, it will be appreciated that subsequent to the shell assembly becoming secured in position on the pipeline, a known procedure can be executed for cutting a coupon out of the pipeline via access through the branch under "live" conditions of the pipeline.

It will also be appreciated that the annular seal must be sufficiently compressible, and ideally also sufficiently robust to withstand and contain with the containment ring line pressure during operation of the pipeline over the working pressures.

If grout is used it may, for example, be selected from the following range: urethanes, polyesters, acrylics, epoxies and cemtatious compounds. It will be appreciated that each should be selected to satisfy the operating temperature, humidity and curing rate which then leads to the different adhesion strengths for different applications. Different grout material provides a different exothermic reaction which will determine the volume change after installation. It will also be understood that the volume change of epoxy grout should be optimized to minimize the internal stress system within the grout.

In order to ensure there is a good key for the grout, the external surface of pipeline and the inner surface of the first and second parts of the branch assembly may be dressed up or grit blasted prior to the assembly being mounted on the pipeline.

The invention will now be described, by way of example only, with reference to the accompanying drawings, in which:

FIG. 3 is a schematic side view of the pipeline on which the top and bottom parts of the branch assembly have been secured together in position;

Figure 1:
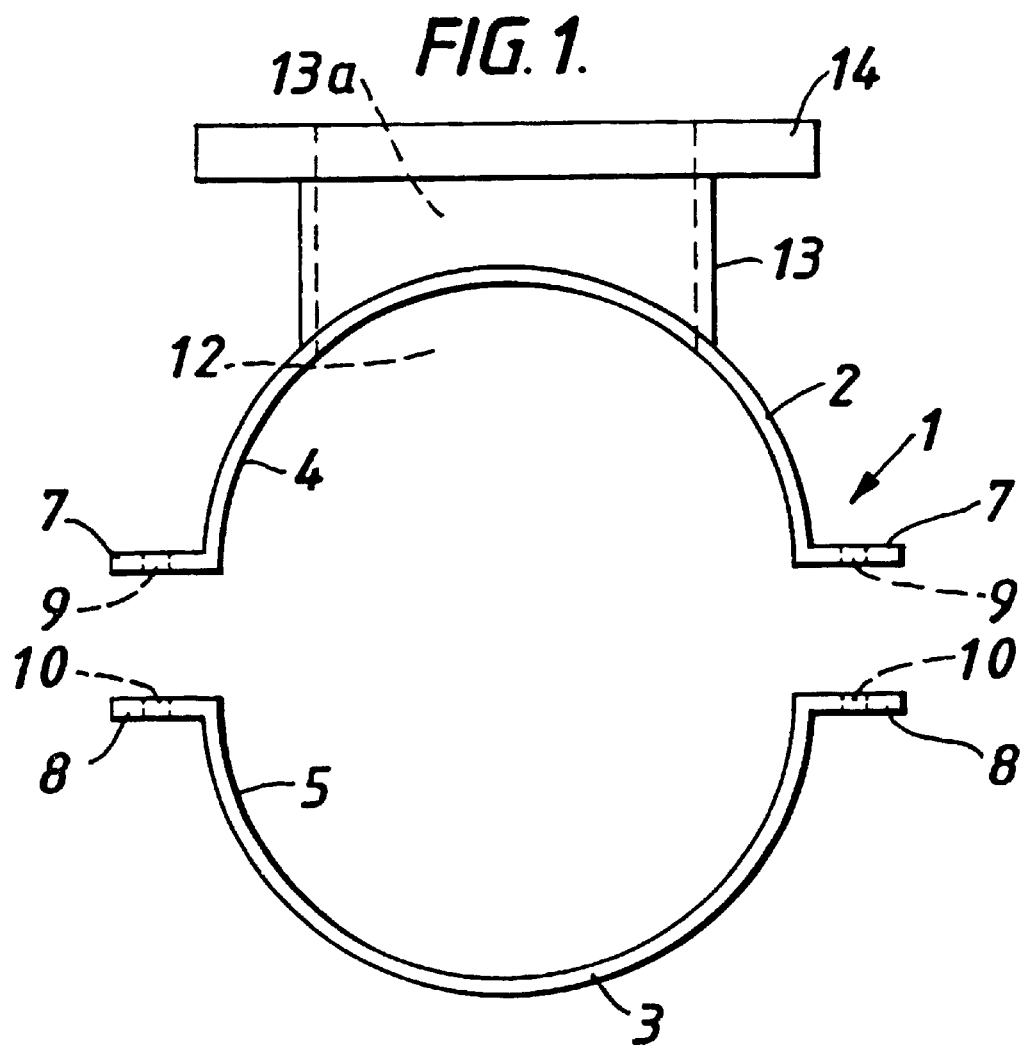
FIG. 1 shows schematically the top and bottom parts of a branch assembly to be used in a method according to the invention.

With reference to FIG. 1, there is shown a branch assembly 1 comprising a first part 2 forming the upper part of the assembly and a second part 3 forming the lower part.

The upper part and lower parts of the assembly 1 are made of carbon steel and have generally part cylindrical portions 4 and 5, respectively, which are securable together about a pipeline 6 via flanges 7 and 8 which extend longitudinally along each side of the upper and lower parts, as can be clearly seen in FIG. 3.

The flanges 7 of the upper part 2 have apertures 9 which are intended to align with apertures 10 in the flanges 8 of the lower part 3 so that securing bolts 11 (see FIGS. 3 and 4) can be passed therethrough to secure the two parts 2 and 3 together on the pipeline.

The upper cylindrical portion 4 includes an apertured section 12 from which extend a short branch pipe 13 terminating in an annular flange 14 to which a branch pipeline having an end flange can be connected in a known fashion (not shown) after the assembly 1 is secured to the pipeline 6.

By way of illustration of the invention, a method of securing the tee assembly 1 to a steel pipeline is described below.

Initially, the area of the external surface of the pipeline to which the branch assembly is to be secured is grit blasted (not shown), as are the inner surfaces of the part-cylindrical portions 4 and 5 of the upper and lower parts of the branch assembly.

A containment ring 16 made of steel and shaped so as to conform to the shape of the pipeline is positioned on the pipeline around the area 6a from which the branch pipe 13 of the branch is to extend.

Figure 2:
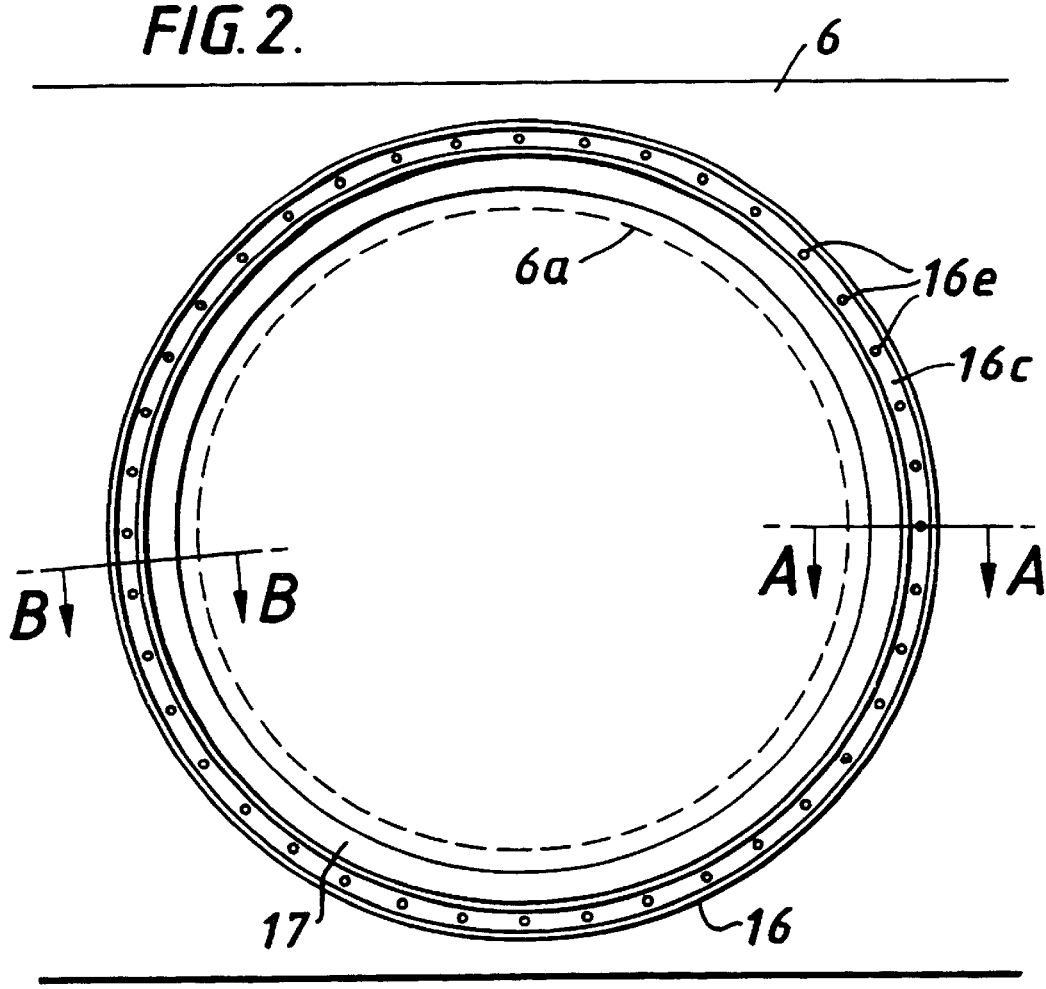
FIG. 2 is a schematic plan view of a pipeline on which is positioned a containment ring and an annular sealing ring in preparation of the pipeline receiving the top part of the branch assembly.
Figure 2A:
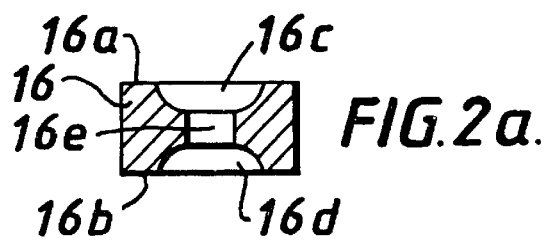
FIGS. 2a and 2b are cross-sectional views of the containment ring taken along the lines A—A and B—B, respectively, in FIG. 2.
Figure 2B:
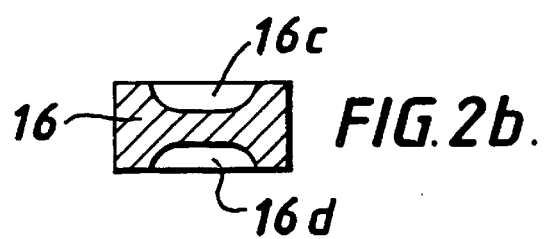
Figure 2C:
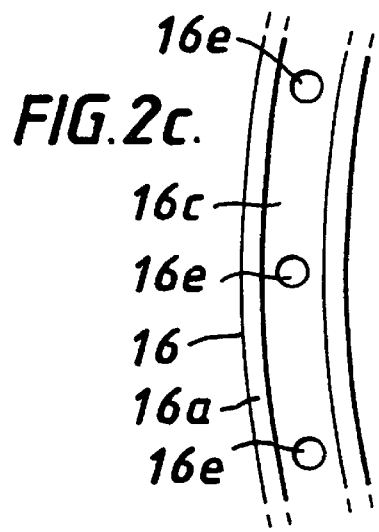
FIG. 2c is an enlarged scrap view of a portion of the containment ring shown in FIG. 2.

As can be better seen in FIGS. 2a, 2b and 2c, the containment ring has upper and lower sides 16a and 16b each provided with a respective upper and lower annular groove 16c and 16d. The annular grooves 16c and 16d are connected to each other by a plurality of passages 16e spaced around the containment ring and extending through the ring from one groove to the other.

An annular seal 17 made for example of rubber or polymer and metal and of greater thickness than the containment ring 16 is then placed within the containment ring so as substantially to conform to the shape of the pipeline 6 (see FIG. 2).

Figure 4:
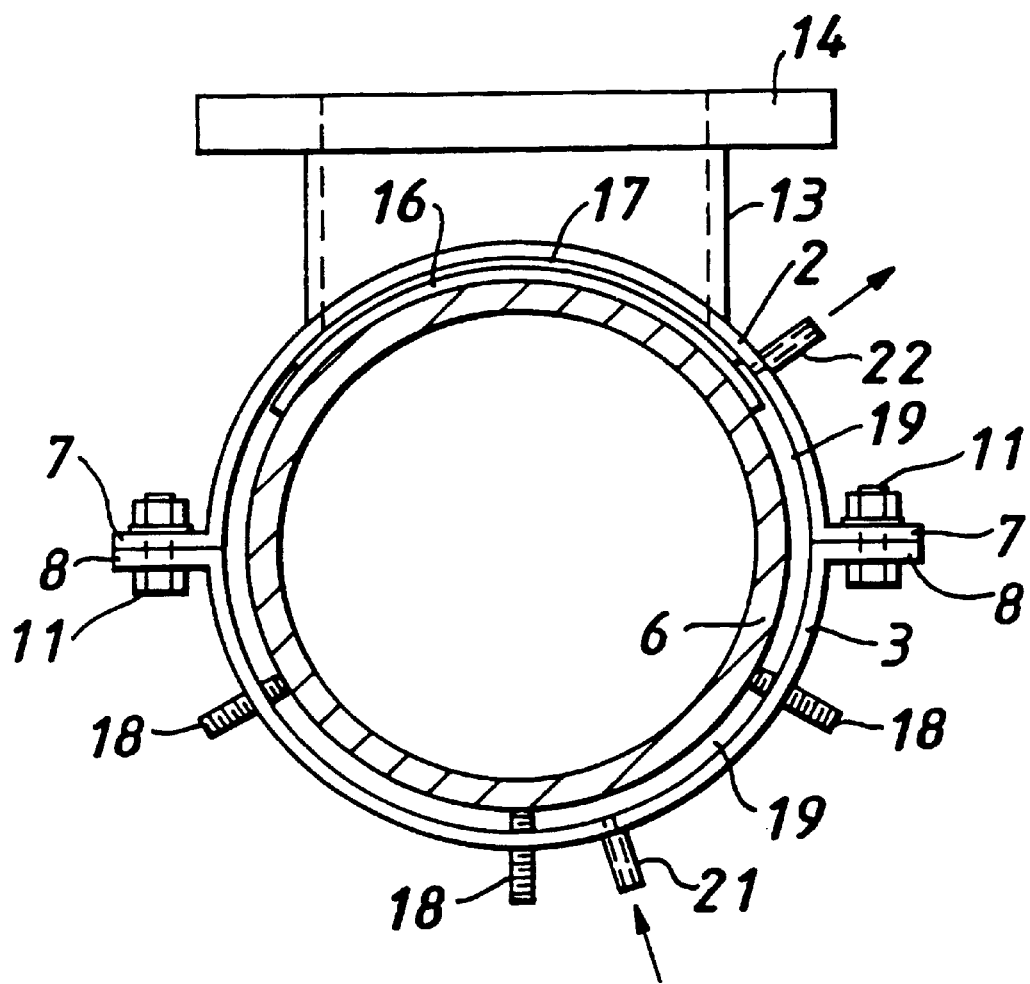
FIG. 4 is a schematic view in the direction of arrow A in FIG. 3.

The upper part 2 of the branch assembly is lowered onto the seal 17, with the bore 13a of the branch pipe 13 being centralised with the area 6a surrounded by the seal and containment ring, the lower part 3 is moved into position on the pipeline, and the upper and lower parts 2 and 3 of the assembly are secured together by means of bolts 11 used in association with the aligned apertures 9 and 10 in the flanges 7 and 8 (see FIGS. 3 and 4).

Jacking bolts 8 are mounted in the wall of the lower part 3 of the branch assembly. These jacking bolts extend through the wall of the lower part to engage or bear on the surface of the pipeline 6, and can be turned from outside of the assembly to be loosened or tightened against the wall of the pipeline. The jacking bolts 18 are adjusted so that the annular seal 17 is sufficiently compressed to provide a suitable seal prior to the introduction of epoxy grout.

Once the tee assembly 1 is in position on the pipeline, a generally cylindrical or annular space or gap 19 is left or defined between the upper and lower parts 2 and 3 and the external surface of the pipeline 6.

The annular space is bounded by sealing means 20, such as suitable putty which is located between the branch assembly and the pipeline at the opposite ends of the assembly, and by the annular seal 17.

The grout is then injected into the annular space 19 via injection opening 21, located towards the bottom of the lower part of the assembly, to fill the annular space. An outlet opening 22 for expressed air and excess injected grout is provided in the upper part of the assembly. After the annular space 19 is filled with grout, the grout is allowed to cure and thereby bond the upper and lower parts 2 and 3, and thus the branch assembly 1, to the pipeline.

When the assembly is securely bonded by the grout to the pipeline, the jacking bolts 18 can be, optionally, loosened off to ensure load is fairly or more evenly distributed on the pipeline by the grout.

With the branch assembly securely bonded to the pipeline, known "live" procedures can be performed for cutting out a coupon from area 6a of the pipeline (not shown) and joining a branch pipeline (not shown) to the branch utilising the branch pipe 13. Such known procedures will not be described here.

Subsequent to the upper and lower parts 2 and 3 being secured together on the pipeline compressing the annular seal 17, flowable sealant is introduced via a hole 23 provided or made in upper part 2. The sealant is introduced into the upper groove 16c and caused to fill the lower groove 16b, the passages 16e and the upper groove 16c to provide sealing between the pipeline 6 and the containment ring 16, and between the containment ring 16 and the upper part 2 of the assembly.

The purpose of providing such sealing of the containment ring to the pipeline 6 and the upper part 2 of the assembly is to endorse or enhance repair or branch addition strategies in case of leakage due to failure of the seal 17 occurring while in service.

A method as described above enables a branch assembly to be bonded to a pipeline without having to employ welding techniques. This is a particular advantage where "live" pipelines are involved, especially where there are high product flow rates through the pipeline. Other advantages of using such a method include minimising unnecessary pressure reduction in the pipeline and enabling cost savings for installations.

Figure 5:
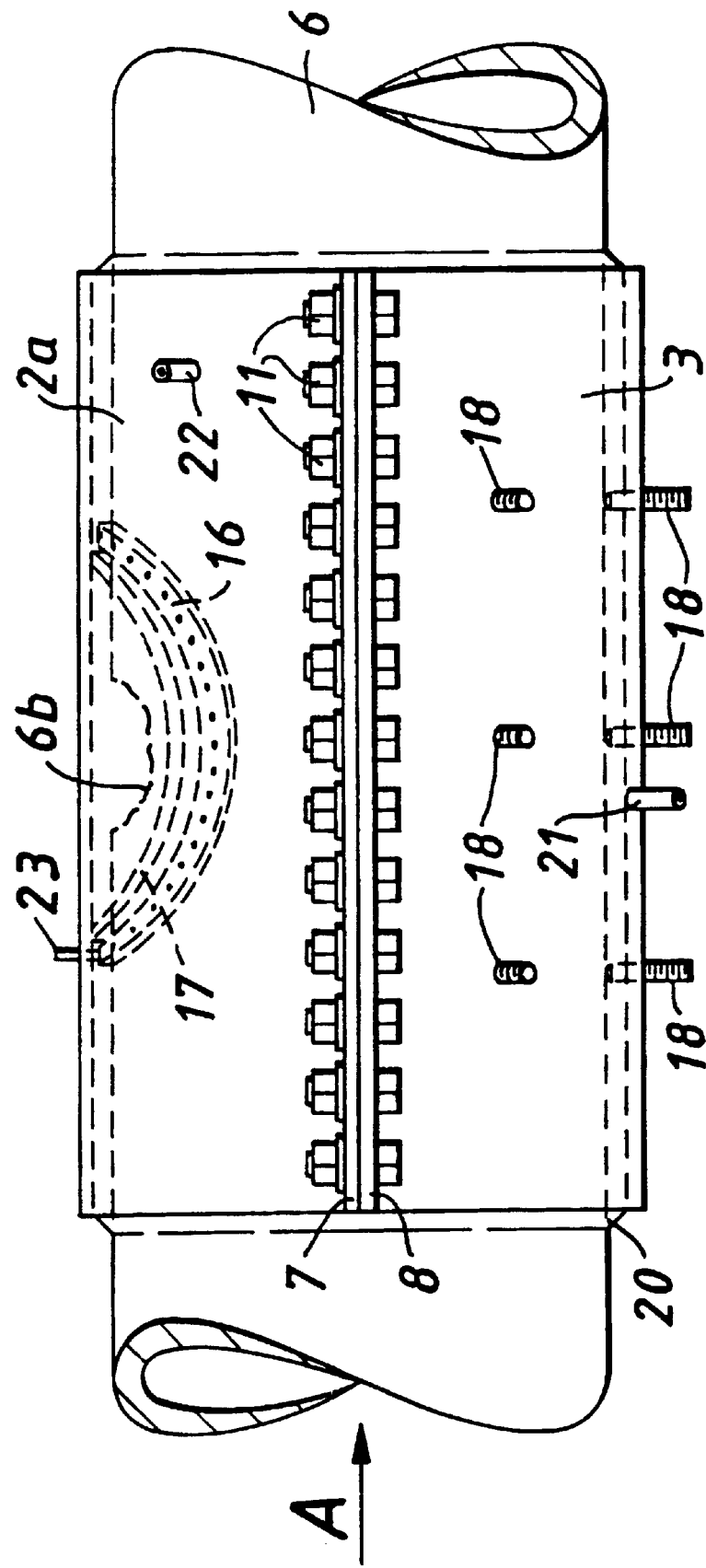
FIG. 5 is a schematic side view of a damaged pipeline on which a shell assembly, in the absence of a branch, has been secured on the pipeline.

FIG. 5 is illustrative of a modified method of the invention to the one described above with respect to FIGS. 1 to 4. In FIG. 5 it will be seen that the upper part 2a does not include a branch. Upper part 2a is like lower part 3.

The pipeline 6 includes a damaged area 6b about which the containment ring 16 and annular seal 17 are positioned prior to the pipeline receiving the upper part 2a of the shell assembly. Otherwise, the method carried out to secure the shell assembly to the pipeline as in connection with FIG. 5 is the same as in connection with the previous Figures and will therefore not be described further.

What is claimed is:

1. A method for securing a shell assembly to a pipeline, wherein the shell assembly includes a first part for locating on a first side of the pipeline removed from a second side that is damaged or from which a branch is to extend, and a second part, optionally incorporating a branch, for locating on the second side that is damaged or from which the branch is to extend, the method comprising:

positioning a containment ring on the pipeline at a required position on the pipeline and surrounding the damaged area or the area from which the branch is to extend;

positioning an annular seal on the pipeline so that the annular seal is wholly radially within the containment ring;

positioning the second part of the shell assembly onto the annular seal;

positioning the first part of the shell assembly on the pipeline and securing the first and second parts together to compress the annular seal and leave an annular space between the first and second parts and an external surface of the pipeline;

providing a sealing device substantially preventing fluid from escaping from the annular space, wherein upper and lower sides of the containment ring are provided with an upper and lower groove, respectively, with the upper and lower annular grooves being connected to each other by a plurality of passages extending through the containment ring between the upper and lower grooves; and introducing sealant by a hole in a wall of the shell assembly, into the upper groove to fill the lower groove, the plurality of passages and the upper groove to provide sealing between the containment ring and the pipeline, and between the containment ring and the shell assembly.

2. A method as claimed in claim 1, wherein the first part forms a lower part of the shell assembly and the second part forms an upper part of the shell assembly.

3. A method as claimed in claim 1, wherein the annular seal is made of one of a rubber and a polymer and metal composite.

4. A method as claimed in claim 2, wherein the annular seal is made of one of a rubber and a polymer and metal composite.

5. A method as claimed in claim 1, further comprising introducing grout into the annular space between the first and second parts and the external surface of the pipeline.

6. A method as claimed in claim 2, further comprising introducing grout into the annular space the first and second parts and the external surface of the pipeline.

7. A method as claimed in claim 3, further comprising introducing grout into the annular space between the first and second parts and the external surface of the pipeline.

8. A method as claimed in claim 4, further comprising introducing grout into the annular space between the first and second parts and the external surface of the pipeline.

9. A method as claimed in claim 1, wherein jacking means are employed to space the first part from the pipeline when the first and second parts have been secured together on the pipeline.

10. A method as claimed in claim 2, wherein jacking means are employed to space the first part from the pipeline when the first and second parts have been secured together on the pipeline.

11. A method as claimed in claim 3, wherein jacking means are employed to space the first part from the pipeline when the first and second parts have been secured together on the pipeline.

12. A method as claimed in claim 4, wherein jacking means are employed to space the first part from the pipeline when the first and second parts have been secured together on the pipeline.

13. A method as claimed in claim 5, wherein jacking means are employed to space the first part from the pipeline when the first and second parts have been secured together on the pipeline.

14. A method as claimed in claim 6, wherein jacking means are employed to space the first part from the pipeline when the first and second parts have been secured together on the pipeline.

15. A method as claimed in claim 7, wherein jacking means are employed to space the first part from the pipeline when the first and second parts have been secured together on the pipeline.

16. A method as claimed in claim 8, wherein jacking means are employed to space the first part from the pipeline when the first and second parts have been secured together on the pipeline.

* * * * *

UNITED STATES PATENT AND TRADEMARK OFFICE
CERTIFICATE OF CORRECTION

PATENT NO.      : 6,612,341 B2
DATED           : September 2, 2003
INVENTOR(S)     : Vu It is certified that error appears in the above-identified patent and that said Letters Patent is hereby corrected as shown below:

<u>Title page,</u>
Insert:
-- [30]   Foreign Application Priority Data
    Apr. 28, 2000          (GB) ...................... 0010329.1 --

Signed and Sealed this

Twenty-third Day of December, 2003

JAMES E. ROGAN
*Director of the United States Patent and Trademark Office*